Patented Aug. 22, 1933

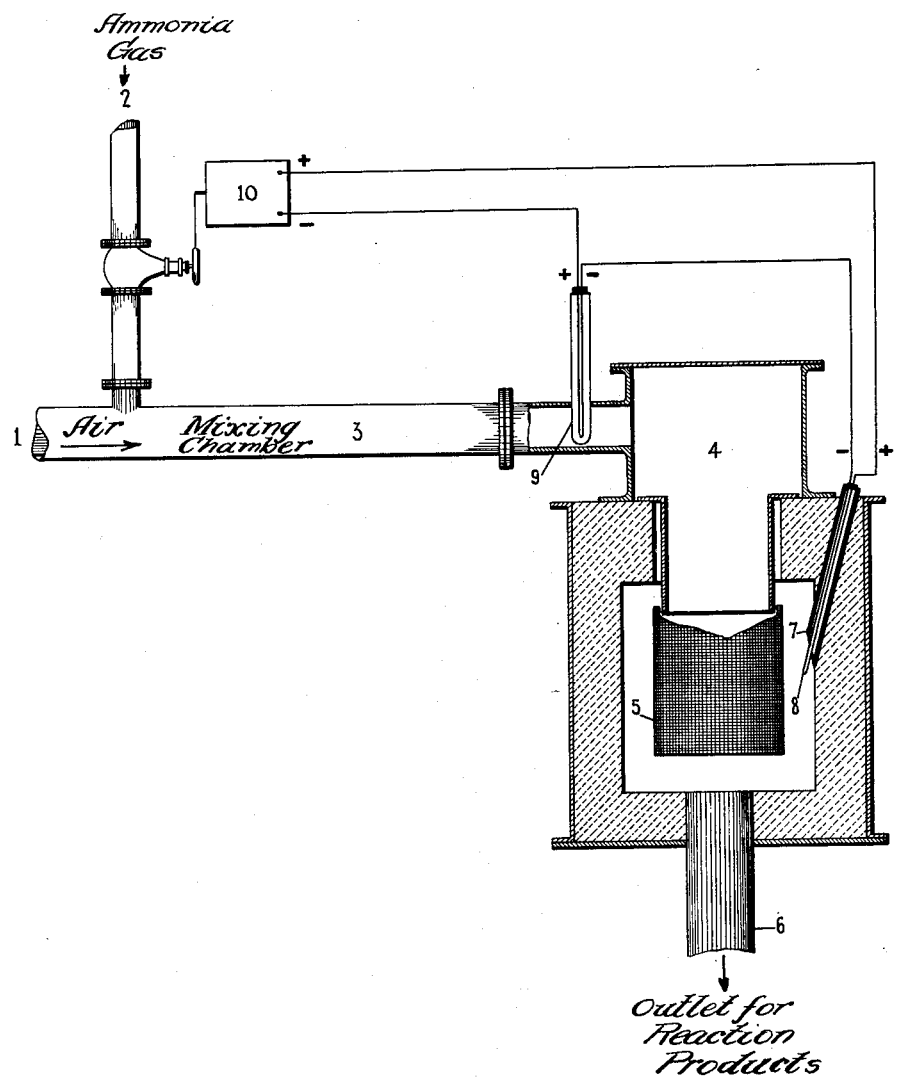

1,923,865

UNITED STATES PATENT OFFICE 1,923,865

TEMPERATURE CONTROL OF CHEMICAL REACTIONS

Stanley L. Handforth, Woodbury, N. J., assignor to E. I. du Pont de Nemours & Company, Wilmington, Del., a Corporation of Delaware Application July 12, 1929. Serial No. 377,665

7 Claims. (Cl. 23—162)

This invention relates to a method of control of chemical processes and more particularly to a method of temperature control of a mixture of products entering into a chemical reaction in which a certain amount of heat is liberated.

Thermo-electric control of chemical processes by means of a thermo-couple placed in the reaction zone has heretofore been proposed. Such a process in its simplest form is in the case of the feeding of gas to a furnace in which the temperature is determined by means of a thermo-couple and the process controlled by means of the necessary auxiliary equipment.

In the oxidation of ammonia to form oxides of nitrogen, air or an oxygen containing gas is usually heated, mixed with a pre-determined quantity of ammonia and passed through a catalyst usually composed either essentially of platinum or a combination of oxides, such as iron, bismuth or cobalt oxides, on which catalyst the reaction to form oxides of nitrogen takes place. The rise in temperature due to the reaction is proportional to the concentration of ammonia in the entering gas except as this is affected by heat losses due to radiation. The temperature of the catalyst is then equal to the temperature of the incoming gas plus this temperature rise due to the reaction less the lowering of the temperature due to radiation losses. To secure maximum efficiency from this process the conditions under which it is carried out must be carefully controlled. For instance, with a catalyst composed essentially of platinum, it has generally been considered that the composition of the entering gas should be controlled within very narrow limits.

I have found, however, that it is more important to control the temperature of the catalyst within narrow limits and that the limits of composition of the entering gas may be broader. If the temperature of the incoming gas is too low, such as is the case when the equipment is cold, and attempt is made to regulate the composition of the entering gas so as to maintain a desired catalyst temperature, it will be necessary to supply a gas so excessively rich in ammonia or other reacting gas that there is likelihood of pre-ignition, resulting in injury to the equipment. Or at least the concentration of ammonia will be above the allowable limit and there will be serious losses. I have found that these difficulties may be overcome by controlling the mixture so as to maintain a pre-determined temperature rise due to the reaction.

One of the objects of the present invention is a method of controlling the temperature of chemical reactions. Another object of my invention is a method of controlling the temperature of reaction of gases. A further object of this invention is a method of controlling the temperature of reaction in the oxidation of gases. Other objects will present themselves as the description proceeds.

These objects are accomplished by the following steps. The approximate temperature of the catalyst is determined by means of a thermocouple placed close to the down-stream side of the catalyst and protected by means of a porcelain or silica shield or a shield made of several layers of metal so that the couple will receive radiation only from the hot catalyst either directly or by reflection from the shield and will not be allowed to radiate to the cooler walls of the containing chamber. The temperature of the entering gas is determined by means of a thermocouple of the same metals placed in the gas stream ahead of the reaction chamber. The two couples are then connected together so that one opposes the other and the electromotive force developed by the circuit will then be proportional to the temperature rise. It is usually possible to maintain the temperature of the incoming gas closely enough by manual means. If then, this temperature rise is controlled by regulating the composition of the mixture either by manual means or by the necessary automatic controllers and valve mechanisms, the temperature of the catalyst will be maintained within the desired limits. Due to changes in radiation, the composition of the entering gas may change slightly but it will remain within satisfactory limits. When the equipment is cold and the incoming gas cold, the temperature of the catalyst will be considerably below the desired temperature. However, due to the greater heat loss on account of cold equipment, the entering gas will contain a higher porportion of ammonia or other reacting gas in order to maintain the desired temperature rise. Thus a temporarily satisfactory balance is obtained even though the conditions are not ideal until the temperature of the incoming gas has reached the desired point. It will be understood that modifications of the foregoing are within the scope of my invention and will be apparent to those skilled in the art.

While my invention is applicable to the control of chemical processes generally, an example will be given as applied specifically to the oxidation of ammonia to form oxides of nitrogen.

The single figure of the drawing is a diagrammatic illustration of one embodiment of my invention. The heated air enters through pipe 1 either by means of a fan at substantially atmospheric pressure or from a compressor at pressures exceeding atmospheric pressure. Ammonia gas enters through pipe 2 and is mixed in a mixing chamber 3. The mixed gases enter chamber 4, pass through catalyst 5, where the reaction occurs, and the reaction products leave the chamber through pipe 6. Thermocouple 8 is placed adjacent to the catalyst and is surrounded by shield 7 so as to receive radiation only from the catalyst. Thermocouple 9 is placed in the gas stream between the mixing chamber and the catalyst chamber. The couples are then connected so that the electromotive force developed by couple 9 opposes that developed by couple 7. The resulting electromotive force or temperature rise is measured by means of instrument 10. A controlling instrument may be used in place of the indicator at 10 and this may be made to control valve 11 so as to admit ammonia to maintain the desired mixture.

It will be apparent that this invention is equally applicable to other processes where it is desired to maintain a constant reacting mixture and where a temperature rise occurs which is proportional to the amount of one or more of the constituents of the entering mixture.

The advantages of my improved method of control of chemical reactions will be apparent. Under normal working conditions, the reaction or catalyst temperature is maintained at the desired point. The composition of the reacting mixture is maintained within allowable limits. In case the entering temperature is low and the equipment cold, such as when starting, the catalyst temperature may be slightly low, but the tendency will be to maintain the mixture at the higher allowable limit, thus partially compensating for the low temperature until the proper conditions are obtained. As a result, both excessively rich mixtures or high temperatures are prevented.

As many apparently widely different embodiments of this invention may be made without departing from the spirit thereof, it is to be understood that I do not limit myself to the foregoing examples or description except as indicated in the following patent claims:

I claim:

1. In a method of controlling a chemical reaction, in which there is an increase in temperature, depending on the rate of supply of one or more of the constituents entering into the reaction, the steps which comprise determining the temperature of the materials entering into the reaction, determining the temperature following the reaction zone, and decreasing the supply of that constituent already present in less than stoichiometric ratio when the difference between these temperatures tends to increase above the predetermined value, and increasing said supply when this difference in temperatures tends to fall below a predetermined value.

2. In a method of controlling the composition of the mixture entering a chemical reaction, in which there is an increase in temperature depending on the rate of supply of one or more of the constituents entering into the reaction, the steps which comprise determining the temperature of the materials entering into the reaction, determining the temperature following the reaction zone, and increasing the proportion of that constituent already present in more than stoichiometric ratio when the difference between these temperatures tends to rise above a predetermined value and decreasing said proportion when the difference between said temperatures tend to fall below a predetermined value.

3. In a method of controlling the composition of the mixture entering a chemical reaction in which there is an increase in temperature that depends on the composition of the mixture entering into the reaction, the steps which comprise determining the temperature of the mixture entering the reaction and the temperature following the reaction and decreasing the proportion of that constituent already present in less than stoichiometric ratio when the difference between these temperatures tends to rise above the predetermined value, and increasing said proportion when the difference between said temperatures tends to fall below a predetermined value.

4. In a method of controlling the composition of the mixture entering a catalytic reaction in which there is a temperature rise that depends on the composition of the mixture entering the catalyst zone, the steps which comprise determining the temperature of the entering mixture and the temperature immediately after the catalyst, and decreasing the proportion of that constituent already present in less than stoichiometric ratio when the difference between these temperatures tends to rise above the predetermined value, and increasing said proportion when the difference between said temperatures tends to fall below a predetermined value.

5. In a method of controlling the composition of the mixture entering a chemical reaction in which there is a temperature rise which depends on the composition of the mixture entering into the reaction, the steps which comprise placing a thermal junction in the line of flow of the mixture ahead of the reaction zone, and one immediately following and adjacent to the reaction zone, connecting said thermal junctions so as to determine the rise of temperature directly from said thermal junction, and decreasing the proportions of that constituent already present in less than stoichiometric ratio when said temperature rise tends to increase above a predetermined value, and increasing said proportion when said temperature rise tends to decrease below the predetermined value.

6. In a method of controlling the composition of the mixture entering a catalytic chemical reaction in which there is a temperature rise which depends on the composition of the mixture entering into the reaction, the steps which comprise placing a thermal junction in the line of flow of the mixture ahead of the reaction zone, and one immediately following and adjacent to the reaction zone, connecting said thermal junctions so as to determine the rise of temperature directly from said thermal junctions and decreasing the proportions of that constituent already present in less than stoichiometric ratio when said temperature rise tends to increase above a predetermined value, and increasing said proportion when said temperature rise tends to decrease below the predetermined value.

7. In a method of regulating and controlling the composition of the mixture entering the catalyst chamber in the process of oxidizing ammonia to nitric oxides, the steps which comprise placing a thermal junction in the line of flow of the mixed gas supplied to the chamber, and a second thermal junction adjacent to the catalyst, and in the line of flow of the gases leaving said catalyst, determining therefrom the temperature rise, and decreasing the proportion of ammonia when said temperature rise tends to increase above a predetermined value and increasing said proportion when said temperature rise tends to fall below a predetermined value.

STANLEY L. HANDFORTH.